United States Patent
Yoshikawa

(10) Patent No.: US 6,470,241 B2
(45) Date of Patent: Oct. 22, 2002

(54) DRIVING STATE MONITORING APPARATUS FOR VEHICLES

(75) Inventor: Kenji Yoshikawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/731,044

(22) Filed: Dec. 7, 2000

(65) Prior Publication Data
US 2001/0003436 A1 Jun. 14, 2001

(30) Foreign Application Priority Data

Dec. 8, 1999 (JP) .............................. 11-348241

(51) Int. Cl.$^7$ ................................. G06F 7/00
(52) U.S. Cl. ................ 701/1; 701/35; 701/38
(58) Field of Search ................ 701/1, 29, 33, 701/35, 36, 38, 41

(56) References Cited

FOREIGN PATENT DOCUMENTS

| JP | A-5-85221 | 4/1993 |
|---|---|---|
| JP | A-8-249600 | 9/1996 |

Primary Examiner—William A. Cuchlinski, Jr.
Assistant Examiner—Edward Pipala
(74) Attorney, Agent, or Firm—Arent Fox Kintner Plotkin & Kahn, PLLC

(57) ABSTRACT

A driving state monitoring apparatus for a vehicle, for monitoring a driving state of a vehicle of a driver is disclosed. According to the apparatus, a behavior parameter indicative of a lateral movement of the vehicle and a vehicle speed are detected. A behavior reference is set according to changes in the behavior parameter. A running locus of the vehicle is calculated according to the behavior parameter, the behavior reference, and the vehicle speed. A plurality of vehicle behavior feature parameters indicative of the feature of vehicle behavior is calculated according to the running locus and it is determined whether or not the driving state of the driver is proper according to the plurality of vehicle behavior feature parameters.

12 Claims, 10 Drawing Sheets

YR

YA, YAR

YAW

LOC

DRIVING STATE MONITORING APPARATUS FOR VEHICLES

BACKGROUND OF THE INVENTION

The present invention relates to a driving state monitoring apparatus for vehicles, which monitors a driving state of the driver of the vehicle and issues an alarm as required.

The driving state of a driver is related to the driving ability of that driver and can be lowered due to fatigue, dozing, etc.

A prior art driving state monitoring apparatus is known which has means for estimating the response delay time of the driver and the deviation between a vehicle position and the running lane according to the amount of steering of the vehicle and the vehicle speed. The apparatus also includes means for comparing the estimated response delay time of the driver and the estimated deviation with a response delay time and a deviation in a normal condition, respectively, and means for determining the driving state of the driver (e.g., an abnormal steering caused by a lowered driving ability due to dozing or fatigue of the driver) (Japanese Patent Laid-open No. Hei 5-85221).

Another prior art driving state monitoring apparatus is known, having means for detecting the yaw rate and the vehicle speed, means for obtaining a reference line for running of the vehicle according to the detected yaw rate and the detected vehicle speed, and means for determining abnormality of the driving state of the driver by using a parameter indicative of the deviation between an actual running locus and the reference line (Japanese Patent Laid-open No. Hei 8-249600).

However, in the above-mentioned conventional monitoring apparatus described in Japanese Patent Laid-open No. Hei 5-85221, the deviation between the actual vehicle position and the running lane (reference vehicle position) is calculated according to the amount of steering and the vehicle speed, but not according to a physical quantity relating directly to vehicle behavior. Accordingly, an error in this deviation can be produced because of changes in vehicle characteristics (e,g., characteristics of the vehicle suspension or the steering device), causing a reduction in accuracy of the determination of the driver's driving state.

On the other hand, in the monitoring apparatus described in Japanese Patent Laid-open No. Hei 8-249600, the driving state is determined by using a yaw rate relating directly to vehicle behavior, thereby improving the determination accuracy. However, because the driving state is determined only according to the parameter indicative of the deviation between the running locus and the reference line, this prior art apparatus lacks the necessary accuracy.

SUMMARY OF THE INVENTION

It is accordingly an object of the present invention to provide a driving state monitoring apparatus which can determine the behavior of a vehicle more precisely than the prior art systems, thereby providing a precise determination of the driving state.

According to the present invention, a driving state monitoring apparatus for a vehicle, for monitoring the driving state of a driver of the vehicle is provided. The apparatus comprises behavior parameter detecting means for detecting a behavior parameter indicative of a lateral movement of the vehicle; vehicle speed detecting means for detecting a vehicle speed of the vehicle; behavior reference setting means for setting a behavior reference according to changes in the behavior parameter; running locus calculating means for calculating a running locus of the vehicle according to the behavior parameter, the behavior reference, and the vehicle speed; vehicle behavior feature parameter calculating means for calculating a plurality of vehicle behavior feature parameters indicative of the feature of vehicle behavior according to the running locus; and driving state determining means for determining whether or not the driving state of the driver is proper according to the plurality of vehicle behavior feature parameters.

With this arrangement, a behavior reference is set according to changes in the behavior parameter indicative of the lateral movement of the vehicle; a running locus of the vehicle is estimated according to the behavior parameter, the behavior reference, and a vehicle speed; a plurality of vehicle behavior feature parameters indicative of the feature of vehicle behavior are calculated according to the running locus; and it is determined whether or not the driving state by the driver is proper according to the plural vehicle behavior feature parameters calculated above. Accordingly, the vehicle behavior can be grasped more precisely over the prior art, thereby effecting precise determination of the driving state.

Preferably, the driving state determining means stepwise determines the abnormality of the driving state according to the plurality of vehicle behavior feature parameters.

Preferably, the behavior reference setting means obtains a simple regression line according to changes in the behavior parameter and sets the simple regression line as the behavior reference.

Preferably, the vehicle behavior feature parameter calculating means calculates at least two parameters of a lateral deviation behavior quantity (LOCWIDTH) which indicates lateral deviation of the running locus with respect to the behavior reference, the number of occurrences (NP) that the absolute value of a fluctuation quantity with respect to the behavior reference exceeds a predetermined fluctuation width ($\Delta h$) in a predetermined measurement time period (T1), the ratio of a maximum fluctuation quantity (LOCWIDTH1) on the plus side with respect to the behavior reference and a maximum fluctuation quantity (LOCWIDTH2) on the minus side with respect to the behavior reference, and the ratio of a maximum length (LOCLEN1) of a plus region along a vehicle running direction where the running locus fluctuates on the plus side with respect to the behavior reference and a maximum length (LOCLEN2) of a minus region along the vehicle running direction where the running locus fluctuates on the minus side with respect to the behavior reference.

Preferably, road shape determining means for determining the shape of a road on which the vehicle is running is further included, and when the road shape determining means determines that the road is substantially straight or curved with a substantially constant radius of curvature, and the driving state determining means determines that the driving state of the driver is not proper, it is determined that the driving state of the driver is abnormal.

Preferably, the road shape determining means estimates the radius of curvature of the road on which the vehicle is running and determines the shape of the road according to the estimated radius of curvature and a change rate of the estimated radius of curvature.

Preferably, the road shape determining means estimates the radius of curvature according to the vehicle speed and a regression coefficient of the simple regression line.

Preferably, the driving state determining means sets a threshold for use in determining whether or not the driving state is proper, according to the vehicle speed and the estimated radius of curvature of the road.

Preferably, the driving state determining means calculates a statistic including at least a mean value from a plurality of measured data of a lateral deviation behavior quantity which indicates lateral deviation of the running locus with respect to the behavior reference, and sets a threshold for use in determining whether or not the driving state is proper, according to the calculated statistic.

Preferably, the driving state determining means determines whether or not the driver intends to make a lane change, and when the driving state determining means determines that the driver does not intend to make the lane change and that the driving state is not proper, it is determined that the driving state of the driver is abnormal.

Preferably, the vehicle behavior feature parameter calculating means calculates the lateral deviation of the running locus with respect to the behavior reference and calculates a maximum amplitude of the lateral deviation in a predetermined time period as the lateral deviation behavior quantity.

Preferably, the vehicle behavior feature parameter calculating means calculates the area of a region surrounded by the running locus and the simple regression line as the lateral deviation behavior quantity.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 1:
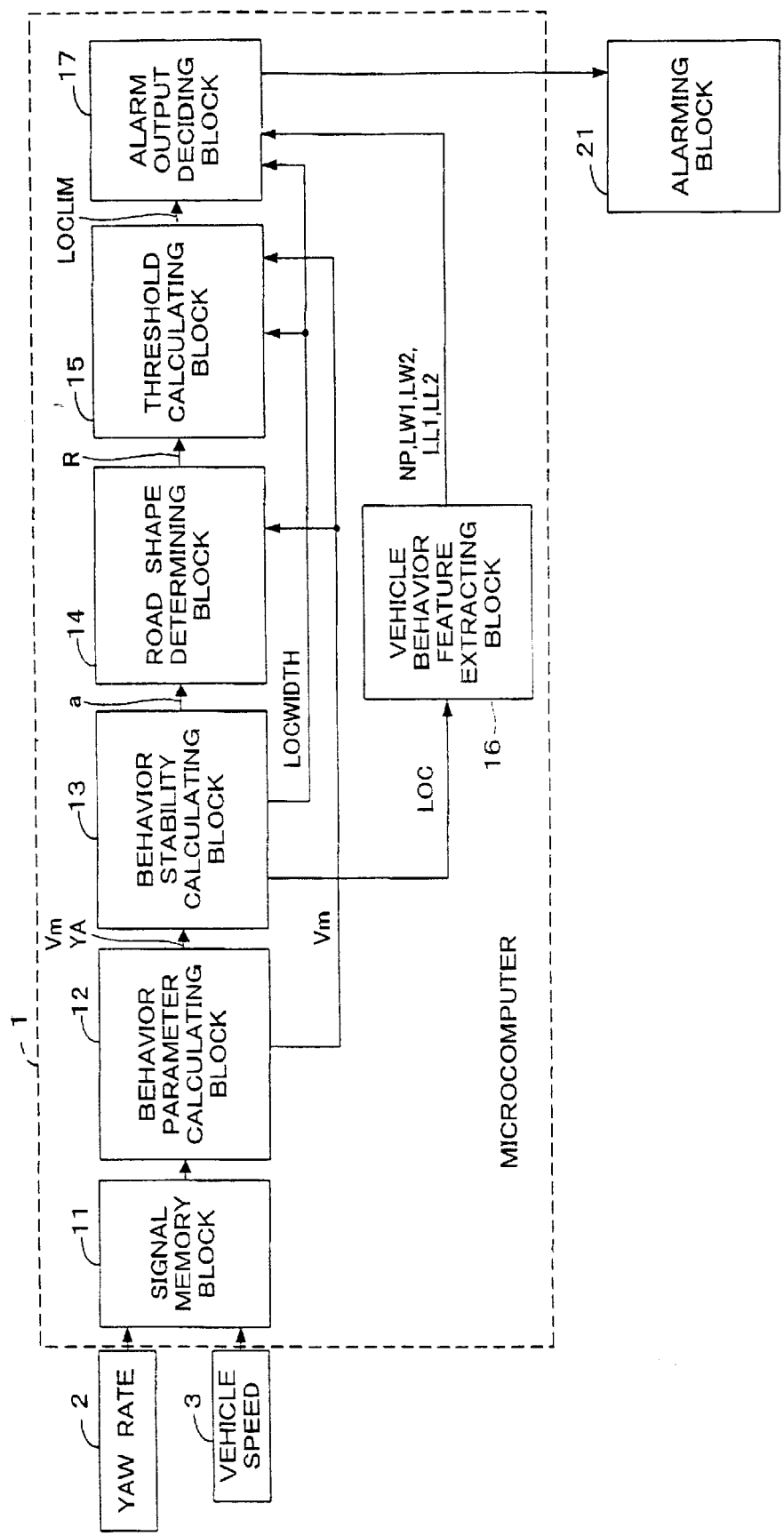
FIG. 1 is a block diagram showing the configuration of a vehicle driving state monitoring apparatus according to a preferred embodiment of the present invention.

FIG. 1 is a block diagram showing the configuration of a driving state monitoring apparatus according to a preferred embodiment of the present invention. This apparatus is mounted on a vehicle driven by a prime mover such as an internal combustion engine or an electric motor, and has a steering device. In FIG. 1, reference numeral 1 generally denotes a microcomputer. A yaw rate sensor 2 for detecting a yaw rate YR of the vehicle and a vehicle speed sensor 3 as vehicle speed detecting means for detecting a running speed (vehicle speed) V of the vehicle, are connected to the input of the microcomputer 1. Further, an alarming block 21 for issuing an alarm as required during monitoring of the driving state of the driver, is connected to the output of the microcomputer 1. The alarming block 21 includes a lamp, buzzer, or voice generator, for example.

The microcomputer 1 has functions which are represented as functional blocks in FIG. 1, i.e. signal memory block 11, behavior parameter calculating block 12, behavior stability calculating block 13, road shape determining block 14, and threshold calculating block 15, vehicle behavior feature extracting block 16, and alarm output deciding block 17.

The signal memory block 11 stores input signals from the yaw rate sensor 2 and the vehicle speed sensor 3, updates yaw rate data and vehicle speed data stored over a predetermined time period T1 (e.g., 10 seconds) preceding the present time at regular time intervals T2 (e.g., 5 seconds), and outputs these updated data to the behavior parameter calculating block 12.

Figure 3A:
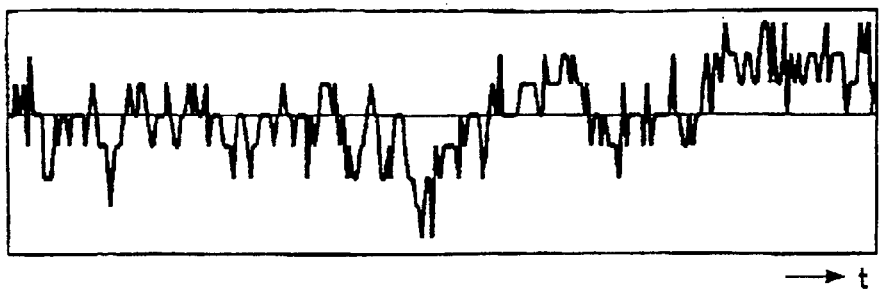
FIGS. 3A to 3D are charts showing an example of changes in yaw rate of a vehicle and in parameters calculated from the yaw rate.
Figure 3B:
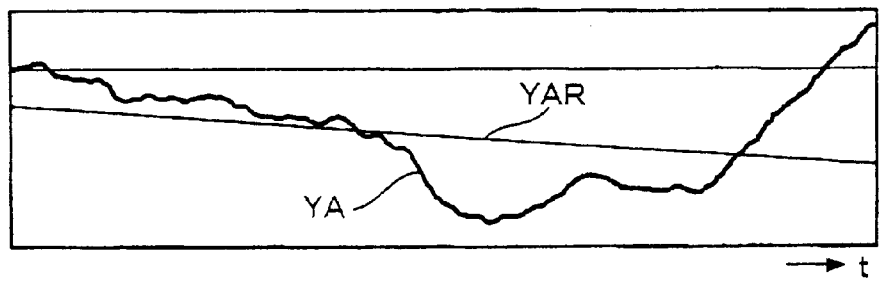

The behavior parameter calculating block 12 integrates the input yaw rate YR (see FIG. 3A) with respect to time and converts it into a yaw angle YA (see FIG. 3B). That is, this preferred embodiment employs a yaw angle YA as a behavior parameter indicative of a quantity of lateral movement of the vehicle. The yaw angle YA obtained in the behavior parameter calculating block 12 is input into the behavior stability calculating block 13. The behavior parameter calculating block 12 also calculates a mean vehicle speed Vm during the time period T1 from the input vehicle speed V, and outputs the calculated mean vehicle speed Vm to the behavior stability calculating block 13, the road shape determining block 14, and the threshold calculating block 15.

The behavior stability calculating block 13 obtains a simple regression line as a behavior reference of the vehicle according to the input yaw angle YA (i.e., obtains constants a and b in an expression of YAR=a·t+b to be hereinafter described), calculates a modified yaw angle YAW with reference to the simple regression line, calculates a running locus LOC (x(i), y(i)) of the vehicle by using the modified yaw angle YAW and the mean vehicle speed Vm, and finally calculates a maximum fluctuation width LOCWIDTH of the running locus LOG in the lateral direction (y direction) as a lateral deviation behavior quantity indicative of the stability of behavior of the vehicle.

More specifically, assuming that yaw angle data of YA, (1), YA(2), ..., YA(i), ..., YA(n) are obtained at the times t(1), t(2), ..., t(i), ..., t(n), respectively, a simple regression coefficient a and a constant b of the simple regression line are calculated from Eqs. (1) and (2) to obtain the simple regression line.

$$a = \frac{\sum_{i=1}^{n} t(i)YA(i) - \sum_{i=1}^{n} t(i) \sum_{i=1}^{n} YA(i)}{\sum_{i=1}^{n} t(i)^2 - \left(\sum_{i=1}^{n} t(i)\right)^2} \tag{1}$$

$$b = YA_{mean} - a \cdot t_{mean} \tag{2}$$

$$tmean = \sum_{i=1}^{n} t(i)/n$$

$$YAmean = \sum_{i=1}^{n} YA(i)/n$$

where "tmean" and "YAmean" represent mean values of the times t(i) and the yaw angles YA(i), respectively.

Letting YAR denote the yaw angle YA on the simple regression line, Eq. (3) is given (see FIG. 3B).

$$YAR = a \cdot t + b \quad (3)$$

Figure 3C:
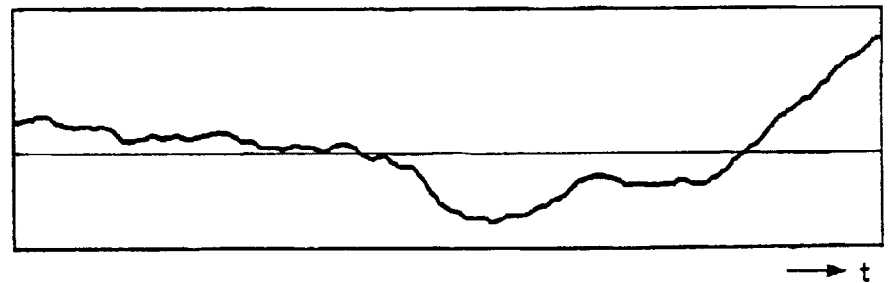

Subsequently, a yaw angle with reference to the simple regression line, i.e., a modified yaw angle YAW (=YA·YAR), is calculated (see FIG. 3C).

Subsequently, the modified yaw angle YAW and the mean vehicle speed Vm are applied to Eqs. (4) and (5) to obtain a running locus (x(i), y(i)) (see FIG. 3D).

$$x(i) = f(Vm \times \cos(YAW(i)))dt \quad (4)$$

$$y(i) = f(Vm \times \sin(YAW(i)))dt \quad (5)$$

Subsequently, the maximum fluctuation width LOCWIDTH of the running locus LOC in the lateral direction (y direction) is output as a lateral deviation behavior quantity indicative of the stability of behavior of the vehicle to the threshold calculating block 15 and the alarm output deciding block 17. The behavior stability calculating block 13 also outputs and the simple regression coefficient a to the road shape determining block 14 and outputs the running locus LOC (x(i), y(i)) to the vehicle behavior feature extracting block 16.

The road shape determining block 14 determines the shape of a road on which the vehicle is running, according to the mean vehicle speed Vm and the simple regression coefficient a. More specifically, letting Vm(k) and a(k) denote the k⁻th input mean vehicle speed Vm and the k⁻th calculated simple regression coefficient a, respectively, an estimated radius of curvature R is calculated by applying Vm(k) and a(k) to Eq. (6).

$$R = Vm(k)/|a(k)| \quad (6)$$

According to Eq. (6), when the absolute value of the simple regression coefficient a becomes larger, the slope of the simple regression line becomes larger, i.e., the curvature of the road becomes larger, and accordingly the estimated radius of curvature R becomes smaller. On the other hand, when the mean vehicle speed Vm becomes larger, the estimated radius of curvature R becomes larger.

Subsequently, a change rate RR(k) of the estimated radius of curvature R(k) is calculated from Eq. (7).

$$RR(k) = |R(k) - R(k-1)| R(k) \quad (7)$$

If the estimated radius of curvature R(k) is greater than or equal to a straight line determination threshold RLIM, that is, if it is determined that the road is substantially straight, or if the estimated radius of curvature R(k) is less than the straight line determination threshold RLIM and the change rate RR(k) is less than or equal to a constant curve determination threshold RRLIM as a criterion of determination whether the estimated radius of curvature R(k) is substantially constant, the determination of abnormality of the driving state in the alarm output deciding block 17 is enabled.

In this preferred embodiment, the reference line as a reference of determination is approximated by a simple regression line. Accordingly, in the case that the road shape largely changes, improper determination is prone to occur. To cope with this problem, in the case that the road is curved and the change rate RR of the estimated radius of curvature R of the road is large, the determination of abnormality is inhibited to thereby allow accurate determination. The straight line determination threshold RLIM and the constant curve determination threshold RRLIM are experimentally decided so that the decision in the alarm output deciding block 17 described below does not become improper.

The threshold calculating block 15 calculates a determination threshold LOCLIM according to a plurality of measured data of the maximum fluctuation width LOCWIDTH, the vehicle speed Vm, and the estimated radius of curvature R, and outputs the determination threshold LOCLIM calculated above to the alarm output deciding block 17. The processing in the threshold calculating block 15 will be hereinafter described in detail with reference to FIGS. 4 and 5.

The vehicle behavior feature extracting block 16 calculates the number of peaks NP, lateral fluctuation width ratios LW1 and LW2, and longitudinal ratios LL1 and LL2 as vehicle behavior feature parameters according to the running locus LOC, and outputs calculated parameters to the alarm output deciding block 17. The processing in the vehicle behavior feature extracting block 16 will be hereinafter described in detail with reference to FIGS. 6 and 7. In this specification, it is assumed that the maximum fluctuation width LOCWIDTH calculated by the behavior stability calculating block 13 is also included in the vehicle behavior feature parameters.

When the road is determined to be substantially straight or curved with a substantially constant radius of curvature as the result of determination of the road shape by the road shape determining block 14, the alarm output deciding block 17 stepwise determines the level of abnormality of the driving state according to the maximum fluctuation width LOCWIDTH, the number of peaks NP, the lateral fluctuation width ratios LW1 and LW2, and the longitudinal ratios LL1 and LL2, and outputs a command signal for issuing an alarm to the alarming block 21 according to the result of this determination. The processing in the alarm output deciding block 17 will be hereinafter described in detail with reference to FIG. 8.

Figure 2:
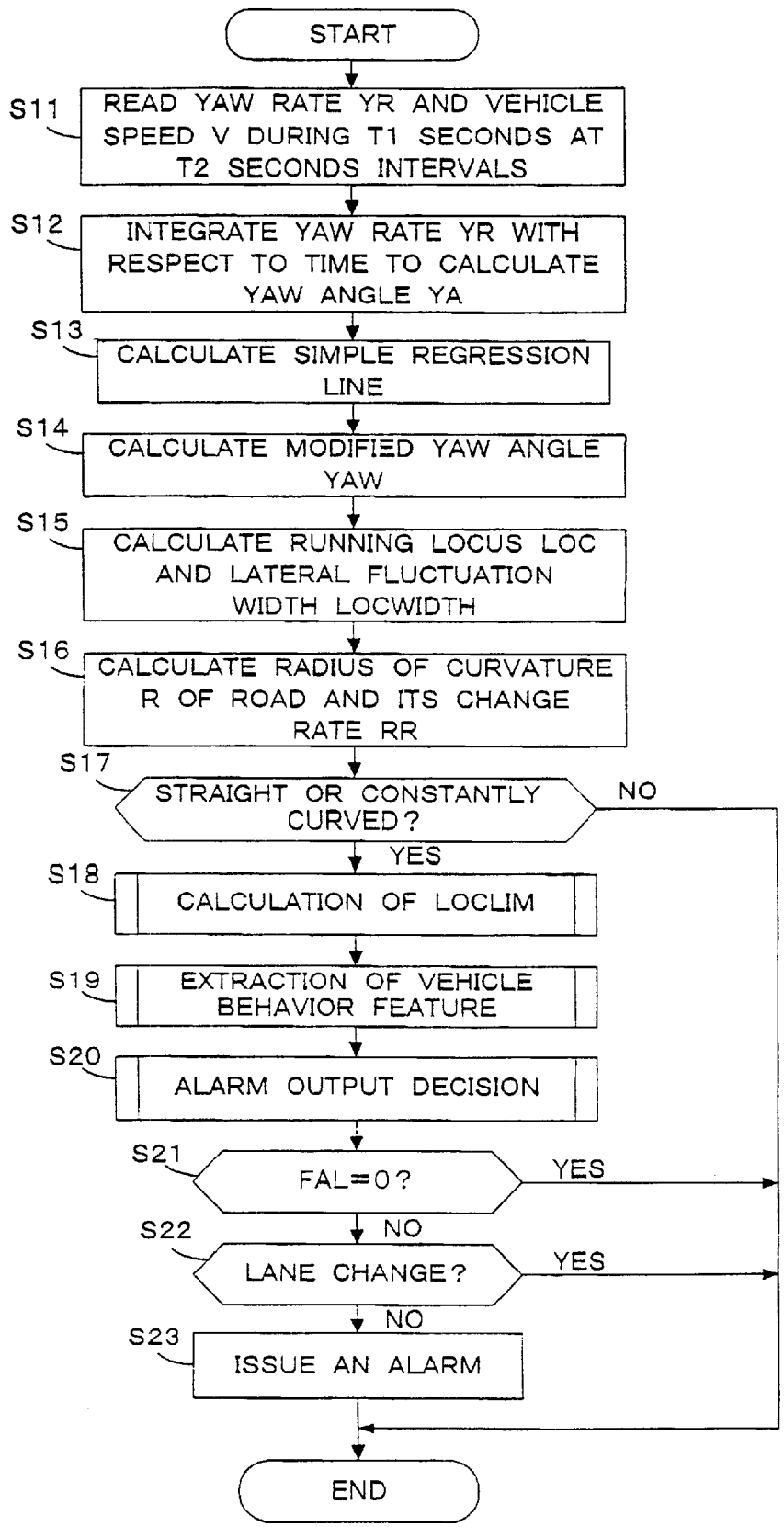
FIG. 2 is a flowchart showing a program for realizing the functions of blocks shown in FIG. 1.

FIG. 2 is a flowchart showing a program executed by the microcomputer 1. More specifically, the functions of the behavior parameter calculating block 12, the behavior stability calculating block 13, the road shape determining block 14, the threshold calculating block 15, the vehicle behavior feature extracting block 16, and the alarm output deciding block 17 mentioned above are realized by the processing shown in FIG. 2 to be executed by a CPU of the microcomputer 1.

In step S11, the yaw rate YR and the vehicle speed V during T1 seconds are read at T2 seconds intervals. The yaw rate YR is next integrated with respect to time to thereby calculate the yaw angle YA (step S12). Subsequently, the time-series data of the yaw angle YA, ie., the times t(i) and the corresponding yaw angles YA(i) are applied to Eqs. (1) and (2) to obtain the simple regression line, i.e., calculate the simple regression coefficient a and the constant b (step S 13).

Subsequently, the modified yaw angle YAW (=YA−YAR) is calculated in step S14, and the mean vehicle speed Vm and the modified yaw angle YAW are applied to Eqs. (4) and (5) to calculate the running locus LOC (x(i), y(i)) and its maximum fluctuation width LOCWIDTH (step S15). In step S16, the estimated radius of curvature R of the road and its change rate RR are calculated by using Eqs. (6) and (7).

Subsequently, it is determined whether or not the road shape is substantially straight or curved with the estimated radius of curvature R being substantially constant, according to the estimated radius of curvature R and its change rate RR. More specifically, it is determined whether or not the estimated radius of curvature R is greater than or equal to the straight line determination threshold RLIM, or whether or not the estimated radius of curvature R is less than RLIM and the change rate RR is less than or equal to the constant curve determination threshold RRLIM (step S17). If the answer to step S17 is negative (NO), that is, if the road shape is not straight or not constantly curved, this program is ended at once to avoid improper determination.

In contrast, if the road shape is straight or constantly curved, the program proceeds to LOCLIM calculation processing (step S18) for calculating the determination threshold LOCLIM to be referred in alarm output decision processing of step S20, vehicle behavior feature extraction processing (step S19) for calculating the vehicle behavior feature parameters, and the alarm output decision processing (step S20) for making a decision whether or not an alarm is to be issued.

Figure 4:
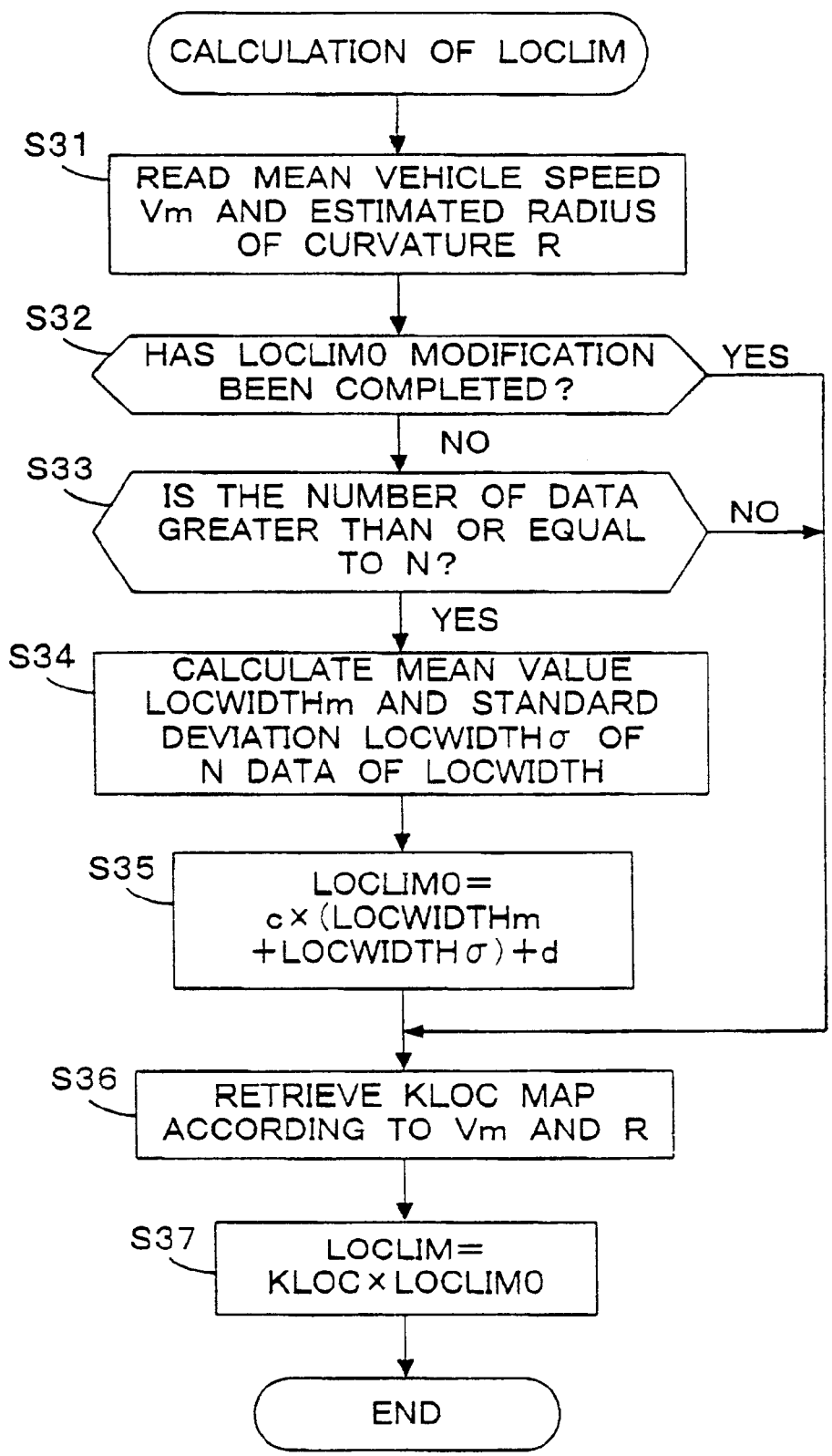
FIG. 4 is a flowchart showing a program for calculating a determination threshold (LOCLIM) to be referred in the processing of FIG. 8.

FIG. 4 is a flowchart showing the LOCLIM calculation processing of step S18 shown in FIG. 2. In this processing, the determination threshold LOCLIM in a predetermined running condition (a condition where the vehicle is running on a straight road at a predetermined vehicle speed (e.g., 100 km/h) is set as a reference threshold LOCLIM0. The reference threshold LOCLIM0 is corrected according to the mean vehicle speed Vm and the estimated radius of curvature R, and is then modified according to a mean value LOCWIDTHm and a standard deviation LOCWIDTHσ of a plurality of measured data of the maximum fluctuation width LOCWIDTH. The plural measured data of the maximum fluctuation width LOCWIDTH to be used in calculation of the mean value and the standard deviation are preliminarily stored in the memory.

In step S31, the mean vehicle speed Vm and the estimated radius of curvature R are read. Thereafter, it is determined whether or not modification of the reference threshold LOCLIM0 to be referred in step S37 has been completed (step S32). At first, the answer to step S32 is negative (NO), so that it is then determined whether or not the number of the measured data of the maximum fluctuation width LOCWIDTH has reached a predetermined number N (e.g., 20) or more (step S33). At first, the answer to step S33 is negative (NO), so that the program proceeds directly to step S36.

If the number of the measured data becomes N in step S33, the mean value LOCWIDTHm and the standard deviation LOCWIDTHσ of the N measured data of the maximum fluctuation width LOCWIDTH are calculated (step S34), and the reference threshold LOCLIM0 is then modified in accordance with Eq. (8) (step S35).

$$LOCLIM0 = c \times (LOCWIDTHm + LOCWIDTH\sigma) + d \qquad (8)$$

where c and d are constants, and Eq. (8) is an equation obtained by experiment, in which the constant c is set to 0.73 and the constant d is set to 0.2 (m), for example.

Once the modification of the reference threshold LOCLIM0 has been completed by executing the steps S34 and S35, the program proceeds from step S32 directly to step S36.

Figure 5:
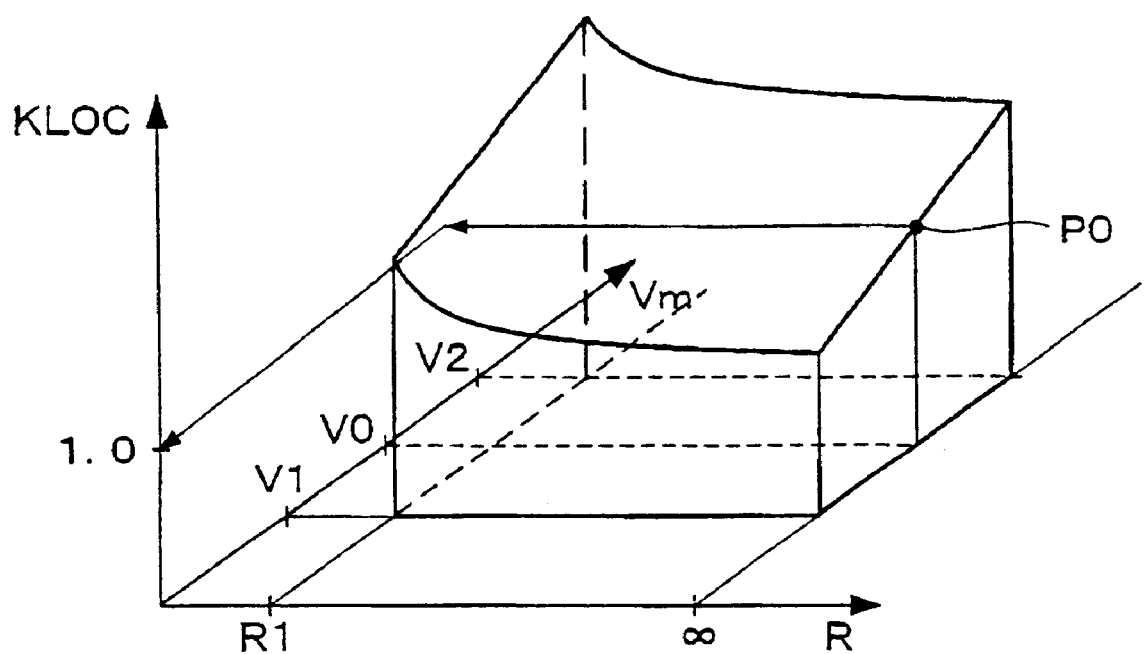
FIG. 5 is a graph showing a map used in the processing of FIG. 4.

In step S36, a KLOC map shown in FIG. 5 is retrieved according to the mean vehicle speed Vm and the estimated radius of curvature R to calculate a correction coefficient KLOC. The KLOC map is set so that the correction coefficient KLOC is equal to 1.0 (noncorrective value) at an operating point P0 where the mean vehicle speed Vm is a predetermined vehicle speed V0 (e.g., 100 km/h) and the road shape is straight (R=∞), and that the correction coefficient KLOC increases with an increase in the mean vehicle speed Vm and with a decrease in the radius of curvature R. Further, if the estimated radius of curvature R is smaller than a predetermined radius of curvature R1 or if the mean vehicle speed Vm is higher than a predetermined vehicle speed V2 or lower than a predetermined vehicle speed V1, the determination of the driving state is not performed.

Subsequently in step S37, the determination threshold LOCLIM is calculated by applying the correction coefficient KLOC to Eq. (9).

$$LOCLIM = KLOC \times LOLIM0 \qquad (9)$$

where LOCLIM0 is a reference threshold corresponding to the operating point P0 shown in FIG. 5. The reference threshold LOCLIM0 is set to a predetermined initial value (e.g., 0.5 m) until the modification in step S35 is executed. After execution of the modification in step S35, a modified value of the reference threshold LOCLIM0 is applied.

Thus, the reference threshold LOCLIM0 is corrected by the correction coefficient KLOC set according to the mean vehicle speed Vm and the estimated radius of curvature R to thereby calculate the determination threshold LOCLIM. Then, the determination threshold LOCLIM calculated above is used for the determination in the alarm output decision processing (step S20 in FIG. 2 and steps S53 and S54 in FIG. 8), thereby improving the determination accuracy and eliminating a possibility that an undue alarm may be issued or conversely a necessary alarm may not be issued.

Furthermore, the reference threshold LOCLIM0 is modified according to the mean value LOCWIDTHm and the standard deviation LOCWIDTHσ of the N maximum fluctuation widths LOCWIDTH measured during normal driving, and the determination threshold LOCLIM is calculated by using the modified reference threshold LOCLIM0. Accordingly, it is possible to set the determination threshold suitable for the maximum fluctuation width LOCWIDTH during normal driving which width varies with the driving manner of the driver, thereby allowing more precise determination of the driving state.

Figure 6:
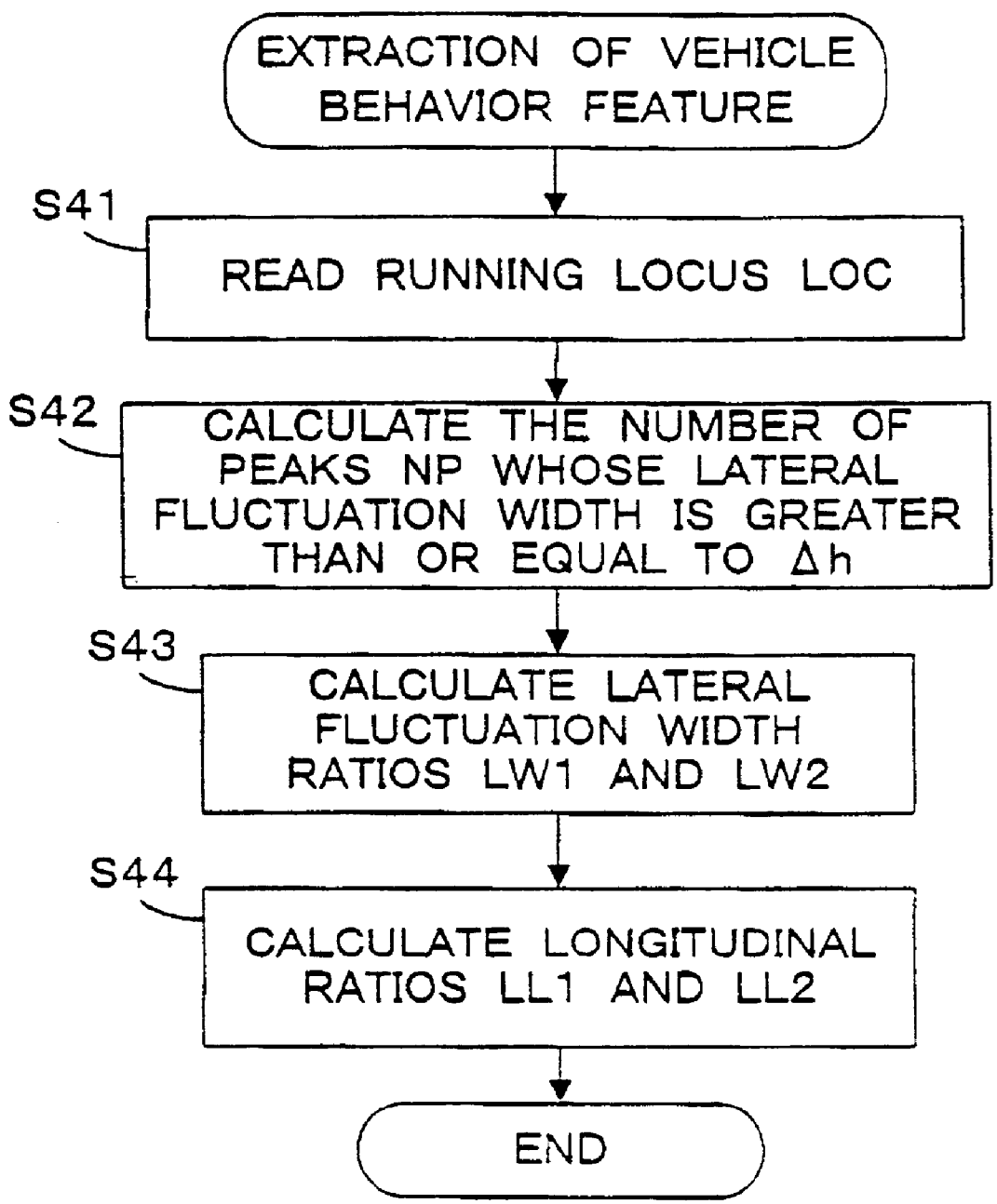
FIG. 6 is a flowchart showing a program for calculating vehicle behavior feature parameters to be referred in the processing of FIG. 8.

FIG. 6 is a flowchart showing the vehicle behavior feature extraction processing of step S19 shown in FIG. 2. In step S41, the data of the running locus LOC calculated in step S15 are read. Thereafter, the number of peaks NP of lateral fluctuations of the running locus LOC is calculated (step S42). In this calculation, the peaks corresponding to lateral fluctuations whose width with respect to the simple regression line (i.e. the absolute value of y coordinate y(i) shown in FIG. 7A) is greater than a predetermined fluctuation width Δh are counted. The number of peaks NP is the number of peaks appearing in a predetermined time period of measurement (e.g., T1=10 seconds). In the example shown in FIG. 7A, NP is equal to "3".

Figure 7A:
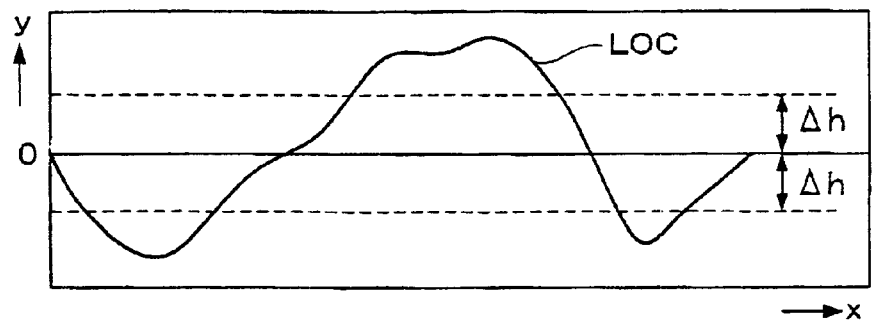
FIGS. 7A to 7D are charts for illustrating the vehicle behavior feature parameters.
Figure 7B:
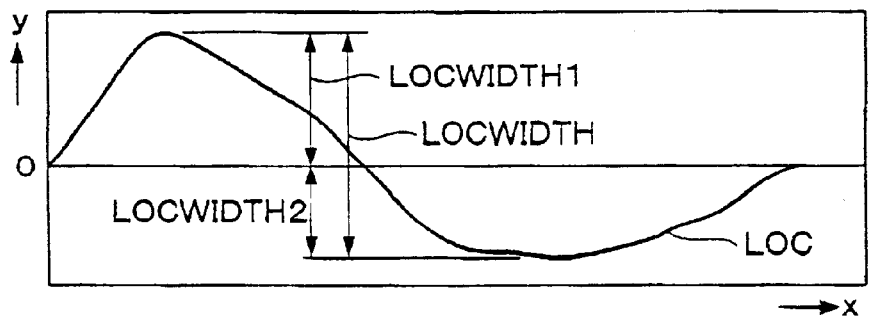

In step S43, the lateral fluctuation width ratios LW1 and LW2 are calculated in accordance with Eqs. (10) and (11).

$$LW1 = LOCWIDTH1/LOCWIDTH \qquad (10)$$

$$LW2 = LOCWIDTH2/LOCWIDTH \qquad (11)$$

where LOCWIDTH1 is a maximum value of the lateral fluctuations on the side of y>0 (LOCWITH1 will be hereinafter referred to as "plus fluctuation") and LOCWIDTH2 is a maximum value of the lateral fluctuations on the side of $y<0$ (LOCWIDTH2 will be hereinafter referred to as "minus fluctuation") as shown in FIG. 7B.

Figure 7C:
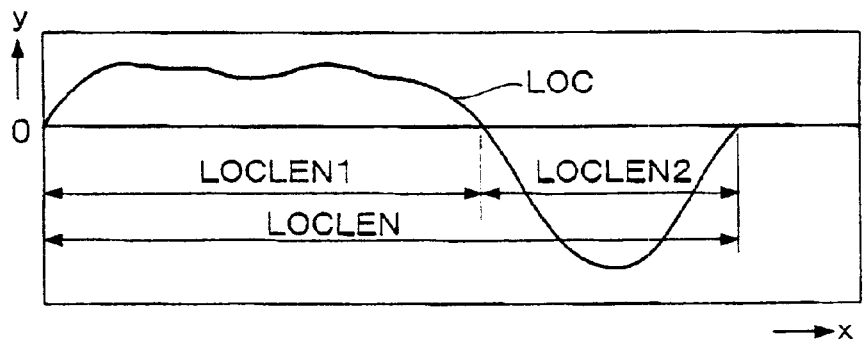

In step S44, the longitudinal ratios LL1 and LL2 are calculated in accordance with Eqs. (12) and (13).

$$LL1 = LOCLEN1/LOCLEN \quad (12)$$

$$LL2 = LOCLEN2/LOCLEN \quad (13)$$

where LOCLEN1 is the length of a region where the running locus LOC is on the side of $y>0$ (the region will be hereinafter referred to as "plus region"), along the x direction (the longitudinal direction of the vehicle) (LOCLEN1 will be hereinafter referred to as "plus region width"), and LOCLEN2 is the length of a region where the running locus LOC is on the side of $y<0$ (the region will be hereinafter referred to as "minus region"), along the x direction (LOCLEN2 will be hereinafter referred to as "minus region length") as shown in FIG. 7C. Further, LOCLEN in Eqs. (12) and (13) is equal to (LOCLEN1+LOCLEN2).

Figure 7D:
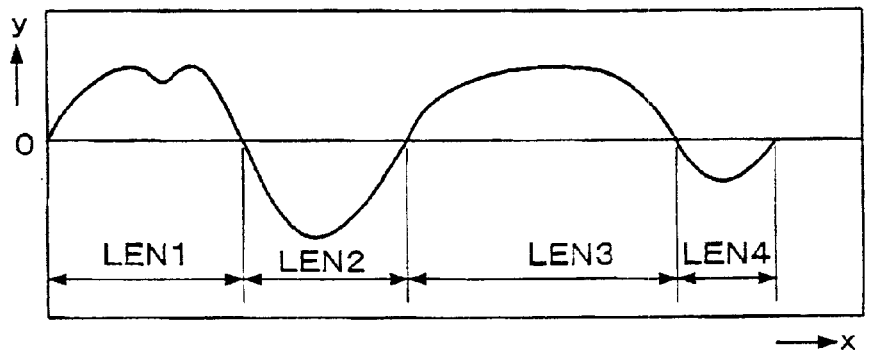

In the case that there are a plurality of plus regions and minus regions as shown in FIG. 7D, the lengths LEN1 and LEN3 of the plus regions along the x direction and the length LEN2 and LEN4 of the minus regions along the x direction are calculated. Then, the maximum value LEN3 of the plus region lengths is used as LOCLEN1, and the maximum value LEN2 of the minus region lengths is used as LOCLEN2. Thus, the longitudinal ratios LL1 and LL2 are calculated by using LOCLEN1 and LOCLEN2.

Figure 8:
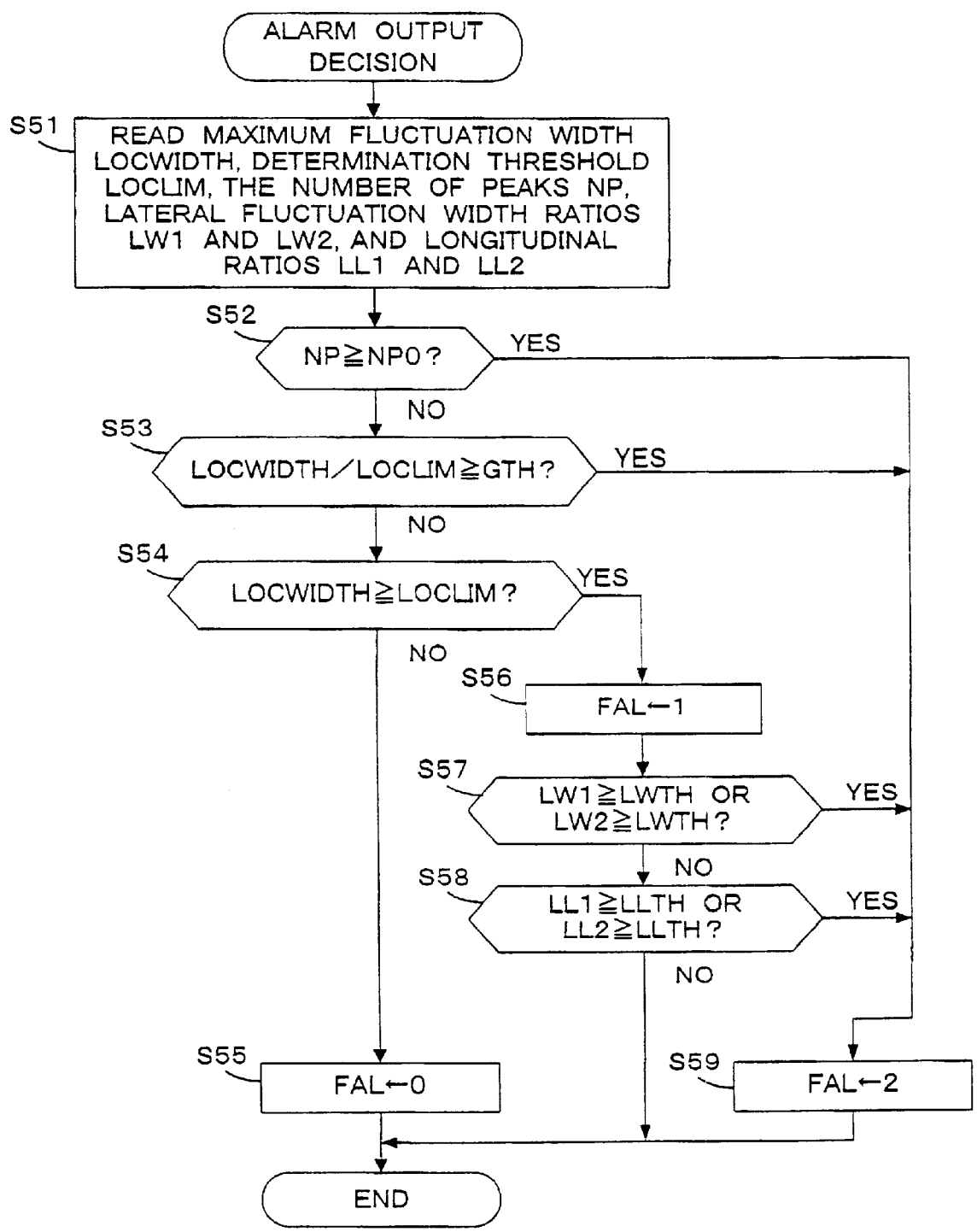
FIG. 8 is a flowchart showing a program for determining whether or not an alarm is to be issued.

FIG. 8 is a flowchart showing the alarm output decision processing of step S20 shown in FIG. 2. In step S51, the maximum fluctuation width LOCWIDTH calculated in step S15 shown in FIG. 2, the determination threshold LOCLIM calculated in the processing of FIG. 4, and the number of peaks NP, the lateral fluctuation width ratios LW1 and LW2, and the longitudinal ratios LL1 and LL2 calculated in the processing of FIG. 6 are read. Thereafter, it is determined whether or not the number of peaks NP is greater than or equal to a predetermined value NPO (e.g., 3) (step S52). If NP is greater than or equal to NPO, which indicates that the number of peaks NP in the measurement time is large, it is determined that the possibility of abnormality of the driving state is high, and an alarm flag FAL is set to "2" (step S59).

If NP is less than NPO, it is determined whether or not the ratio (LOCWIDTH/LOCLIM) of the maximum fluctuation width LOCWIDTH to the determination threshold LOCLIM is greater than or equal to a predetermined value GTH (e.g., 2) (step S53). If LOCWIDTH/LOCLIM is greater than or equal to GTH, it is determined that the possibility of abnormality of the driving state is high, so that the program proceeds to step S59.

If LOCWIDTH/LOCLIM is less than GTH in step S53, it is determined whether or not the maximum fluctuation width LOCWIDTH is greater than or equal to the determination threshold LOCLIM (step S54). If LOCWIDTH is less than LOCLIM, it is determined that the driving state is normal, so that the alarm flag FAL is set to "0" (step S55).

On the other hand, if LOCWIDTH is greater than or equal to LOCLIM in step S54, it is determined that there is a possibility that the driving state may be abnormal, so that the alarm flag FAL is set to "1" (step S56). Thereafter, it is determined whether or not the lateral fluctuation width ratio LW1 or LW2 is greater than or equal to a predetermined lateral ratio LWTH (e.g., 0.6) (step S57). If LW1 is greater than or equal to LWTH or LW2 is greater than or equal to LWTH, which indicates that the fluctuation to the right side or the left side (the plus side or the minus side) with respect to the behavior reference is large, it is determined that the possibility of abnormality of the driving state is high, so that the program proceeds to step S59.

If LW1 is less than LWTH and LW2 is less than LWTH, it is further determined whether or not the longitudinal ratio LL1 or LL2 is greater than or equal to a predetermined longitudinal ratio LLTH (e.g., 0.6) (step S58). If LL1 is greater than or equal to LLTH or LL2 is greater than or equal to LLTH, which indicates that the distance traveled on the right side or the left side with respect to the behavior reference is long, it is determined that the possibility of abnormality of the driving state is high, so that the program proceeds to step S59. On the other hand, if LL1 is less than LLTH and LL2 is less than LLTH in step S58, the program is ended, and the alarm flag FAL is maintained at According to the processing of FIG. 8, whether or not the driving state is normal is determined according to the maximum fluctuation width LOCWIDTH, the number of peaks NP, the lateral fluctuation width ratios LW1 and LW2, and the longitudinal ratios LL1 and LL2 as the vehicle behavior feature parameters. Accordingly, the vehicle behavior can be grasped more precisely over the prior art, thereby allowing accurate determination of the driving state. Further, the level of abnormality of the driving state is determined in two steps. That is, in the case that there is a possibility of abnormality, the alarm flag FAL is set to "1", whereas in the case that the possibility of abnormality is high, the alarm flag FAL is set to "2". Accordingly, a stepwise action in issuing an alarm to be hereinafter described can be effected as described below.

Referring back to FIG. 2, the processing of step S20 is followed by step S21. In step S21, it is determined whether or not the alarm flag FAL is "0". If FAL=0, the program is ended at once. If FAL=1 or 2, it is determined whether or not a lane change has been made (step S22). If a lane change has been made, the program is ended at once, whereas if no lane change has been made, an alarm is issued (step S23). The way of issuing the alarm is preferably changed between the case of FAL=1 and the case of FAL=2. For example, in the case of FAL=2, an alarm sound larger than that in the case of FAL=1 may be issued, or both illuminating a lamp and sounding a buzzer may be carried out. Further, in the case of using an intervehicle distance alarm device for detecting an intervehicle distance DV between the vehicle and its preceding vehicle and issuing an alarm when the detected intervehicle distance DV becomes smaller than a threshold DVTH, the threshold DVTH may be set longer (e.g., changed from 50 m to 80 m) if FAL=2. Alternatively, in the case of using a lane departure alarm device for detecting a distance DWL from the vehicle to a white stripe on the road and issuing an alarm when the detected distance DWL becomes smaller than a threshold DWLTH, the threshold DWLTH may be set longer (e.g., changed from 0.2 m to 0.4 m) if FAL=2.

Figure 9:
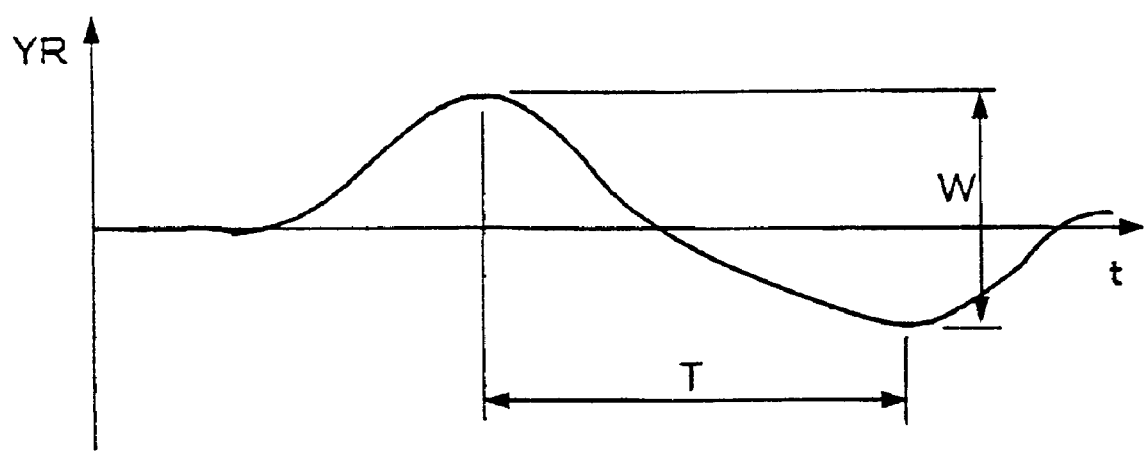
FIG. 9 is a time chart showing changes in the yaw rate in the case of making a lane change.

The determination whether or not the lane change has been made in step S22 is performed in the following manner. It is known that the yaw rate YR changes with time as shown in FIG. 9 when the lane change has been made. Accordingly, a time period T from an instant when the yaw rate YR shows a peak in one direction (e.g., rightward direction) to an instant when the yaw rate YR shows a peak in the other direction (e.g., leftward direction) is measured, and a difference W between these peaks (amplitude of the yaw rate) is also measured. In the case that the time period T is in the range between predetermined time periods TT1 and TT2 (TT1>TT2) and that the amplitude W is larger than a predetermined value W0, it is determined that the lane change has been made. The predetermined time periods TT1 and TT2 and the predetermined value W0 are experimentally set by measuring the yaw rate YR when actually making the lane change.

According to the preferred embodiment as described above, the maximum fluctuation width LOCWIDTH, the number of peaks NP, the lateral fluctuation width ratios LW1 and LW2, and the longitudinal ratios LL1 and LL2 are calculated as the vehicle behavior feature parameters, and it is determined whether or not the driving state of the vehicle is normal according to these plural vehicle behavior feature parameters. Accordingly, the determination accuracy can be improved over the prior art, thereby eliminating a possibility that an alarm may be erroneously issued when the driving state is normal, thus bothering the driver or a possibility that the abnormality of the driving state may not be detected. Further, the level of abnormality is determined stepwise according to the plural vehicle behavior feature parameters. Accordingly, when the level of abnormality is low (FAL=1) so that the vehicle behavior is unstable a little, a small alarm sound may be issued, whereas when the level of abnormality is high (FAL=2), a large alarm sound may be issued. Thus, the stepwise action in issuing the alarm can be effected.

In this preferred embodiment, the yaw rate sensor 2 and the behavior parameter calculating block 12 (steps S11 and S12 in FIG. 2) correspond to the behavior parameter detecting means; the behavior stability calculating block 13 (steps S13, S14, and S15 in FIG. 2) corresponds to the behavior reference setting means and a part of the vehicle behavior feature parameter calculating means; the vehicle behavior feature extracting block 16 (step S19 in FIG. 2 and the processing of FIG. 6) corresponds to a part of the vehicle behavior feature parameter calculating means; and the alarm output deciding block 17 corresponds to the driving state determining means.

Figure 10:
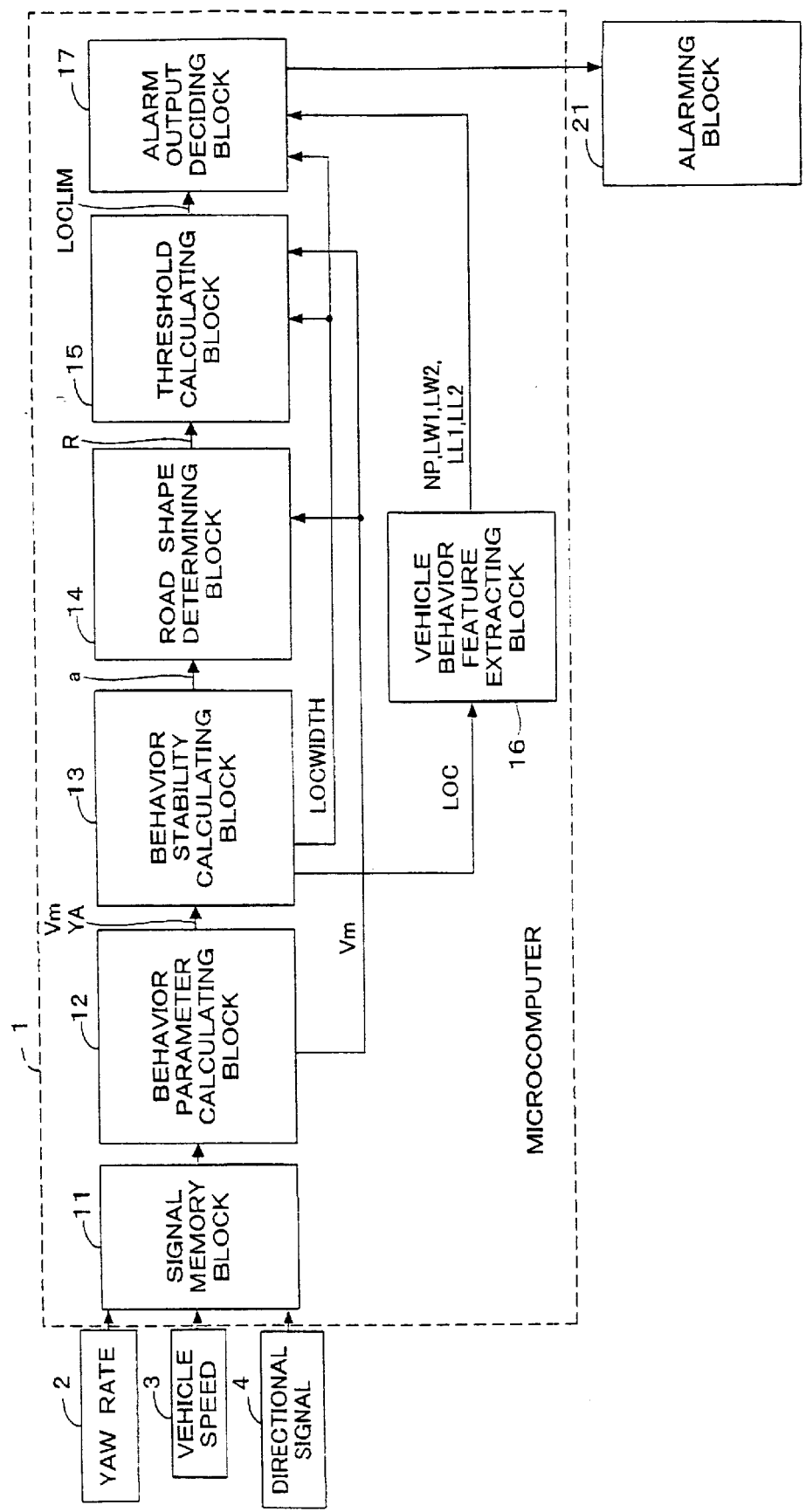
FIG. 10 is a block diagram showing a modification of the configuration shown in FIG. 1.

The present invention is not limited to the above preferred embodiment, but various modifications may be made. For example, an output from a directional signal switch 4 may be supplied to the microcomputer 1 as shown in FIG. 10, and the determination whether or not a lane change has been made (step S22 in FIG. 2) may be performed according to the output from the directional signal switch 4.

Further, the determination condition that the lateral fluctuation width ratio LW1 is greater than or equal to the predetermined ratio LWTH (step S57 in FIG. 8) can be transformed into Eq. (14). Similarly, the determination condition that the lateral fluctuation width ratio LW2 is greater than or equal to the predetermined ratio LWTH (step S57 in FIG. 8) can also be transformed into Eq. (15). Accordingly, the determination of step S57 may be replaced by the determination whether or not the ratio of the plus fluctuation LOCWIDTH1 and the minus fluctuation LOCWIDTH2 (LOCWIDTH1/LOCWIDTH2 or LOCWIDTH2/LOCWIDTH1) is greater than or equal to a predetermined ratio LWTHa.

$$LW1 = \frac{LOCWIDTH1}{LOCWIDTH}$$

$$= \frac{LOCWIDTH1}{LOCWIDTH1 + LOCWIDTH2} \geq LWTH$$

$$LOCWIDTH1 \geq LWTH \times (LOCWIDTH1 + LOCWIDTH2)$$

$$(1-LWTH) \times LOCWIDTH1 \geq LWTH \times LOCWIDTH2$$

$$\frac{LOCWIDTH1}{LOCWIDTH2} \geq \frac{LWTH}{(1-LWTH)} \qquad (14)$$
$$\parallel$$
$$LWTH_a$$

$$\frac{LOCWIDTH2}{LOCWIDTH1} \geq LWTH_a \qquad (15)$$

Similarly, the determination condition that the longitudinal ratio LL1 or LL2 is greater than or equal to the predetermined ratio LLTH (step S58 in FIG. 8) can be transformed into Eq. (16) or Eq. (17). Accordingly, the determination of step S58 may be replaced by the determination whether or not the ratio of the plus region length LOCLEN1 and the minus region length LOCLEN2 is greater than or equal to a predetermined ratio LLTHa.

$$\frac{LOCWIDTH1}{LOCWIDTH2} \geq \frac{LWTH}{(1-LWTH)} \qquad (16)$$
$$\parallel$$
$$LWTH_a$$

$$\frac{LOCLEN2}{LOCLEN1} \geq LLTH_a \qquad (17)$$

Figure 3D:
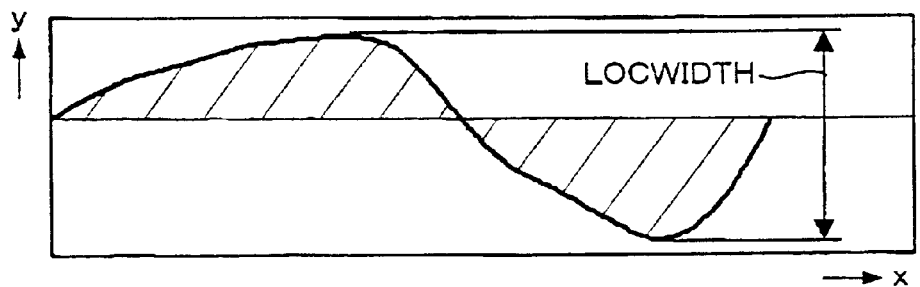

While the above preferred embodiment employs the maximum fluctuation width LOCWIDTH of the running locus LOC as the lateral deviation behavior quantity indicative of the stability of vehicle behavior, the area of a region hatched in FIG. 3D (the area of a region surrounded by the running locus LOC and a straight line passing through the running locus LOC at its substantially central position) may be used in place of the maximum fluctuation width LOCWIDTH.

Further, while the determination of the road shape is performed by using the estimated radius of curvature R and its change rate RR in the above preferred embodiment, the reciprocal of the estimated radius of curvature or the absolute value of the simple regression coefficient a may be used as a road shape determination parameter PR. In this case, the road shape determination parameter PR increases as the curvature of the road becomes larger. Accordingly, if the value of PR is less than or equal to a straight line determination threshold PRLIM, it is determined that the road shape is substantially straight, whereas if the change rate RPR of the road shape determination parameter PR is less than or equal to a constant curve determination threshold RRLIM, it is determined that the road shape is curved with a substantially constant radius of curvature.

Further, while the above preferred embodiment employs the mean value LOCWIDTHm and the standard deviation LOCWIDTH σ of the N maximum fluctuation widths LOCWIDTH as a statistic for the calculation of the reference threshold LOCLIM0, the standard deviation may be replaced by a dispersion of the N maximum fluctuation widths LOCWIDTH.

Further, the reference threshold LOCWIDTH0 may be calculated from Eq. (8a) in place of Eq. (8).

$$LOCLIM0 = LOCWIDTHm + c' \times LOCWIDTH\sigma \qquad (8a)$$

where c' is a constant experimentally set to a value of about 1 to 2, for example.

Further, while the above preferred embodiment employs a simple regression line of yaw angle YA as the behavior reference, a reference line as shown in Japanese Patent Laid-open No. Hei 8-249600 may be used in place of the simple regression line.

Further, while the alarming block 21 in the above preferred embodiment is configured to appeal to the visual or auditory sense of the driver, any other alarming methods may be adopted such as a method of directly acting on the driver by vibrating a driver's seat or by applying a tension to a seat belt, a method of releasing a specific smell into the compartment, or a method of changing the operating condition of an air conditioner. By adopting such methods, the driver can more reliably know a deterioration in the driving state.

Further, while the yaw rate is detected by the yaw rate sensor 2 in the above preferred embodiment, the yaw rate may be calculated by using outputs from a wheel speed sensor and a vehicle speed sensor or outputs from a steering angle sensor and a lateral acceleration sensor.

Further, in the case that a navigation system is mounted on the vehicle, the information (radius of curvature) indicative of the road shape may be obtained from a present position of the vehicle and map information stored in the navigation system.

What is claimed is:

1. A driving state monitoring apparatus for a vehicle, for monitoring a driving state of a driver of said vehicle, comprising:

behavior parameter detecting means for detecting a behavior parameter indicative of a lateral movement of said vehicle;

vehicle speed detecting means for detecting a vehicle speed of said vehicle;

behavior reference setting means for setting a behavior reference according to changes in the behavior parameter;

running locus calculating means for calculating a running locus of said vehicle according to the behavior parameter, the behavior reference, and the vehicle speed;

vehicle behavior feature parameter calculating means for calculating a plurality of vehicle behavior feature parameters indicative of a feature of vehicle behavior according to the running locus; and driving state determining means for determining whether or not the driving state of the driver is proper according to the plurality of vehicle behavior feature parameters.

2. A driving state monitoring apparatus according to claim 1, wherein said driving state determining means stepwise determines an abnormality of the driving state according to the plurality of vehicle behavior feature parameters.

3. A driving state monitoring apparatus according to claim 1, wherein said behavior reference setting means obtains a simple regression line according to changes in the behavior parameter and sets the simple regression line as the behavior reference.

4. A driving state monitoring apparatus according to claim 1, wherein said vehicle behavior feature parameter calculating means calculates at least two parameters of a lateral deviation behavior quantity, which indicates lateral deviation of the running locus with respect to the behavior reference, a number of occurrences that an absolute value of a fluctuation quantity with respect to the behavior reference, exceeds a predetermined fluctuation width in a predetermined measurement time period, a ratio of a maximum fluctuation quantity on a plus side, with respect to the behavior reference and a maximum fluctuation quantity on a minus side, with respect to the behavior reference, and a ratio of a maximum length of a plus region along a vehicle running direction where the running locus fluctuates on the plus side with respect to the behavior reference and a maximum length of a minus region along the vehicle running direction where the running locus fluctuates on the minus side with respect to the behavior reference.

5. A driving state monitoring apparatus according to claim 3, further including road shape determining means for determining a shape of a road on which said vehicle is running, wherein when said road shape determining means determines that the road is substantially straight or curved with a substantially constant radius of curvature, and said driving state determining means determines that the driving state of the driver is not proper, it is determined that the driving state of the driver is abnormal.

6. A driving state monitoring apparatus according to claim 5, wherein said road shape determining means estimates the radius of curvature of the road on which said vehicle is running and determines the shape of the road according to an estimated radius of curvature and a change rate of the estimated radius of curvature.

7. A driving state monitoring apparatus according to claim 6, wherein said road shape determining means estimates the radius of curvature according to the vehicle speed and a regression coefficient of the simple regression line.

8. A driving state monitoring apparatus according to claim 6, wherein said driving state determining means sets a threshold for determining whether or not said driving state is proper, according to the vehicle speed and the estimated radius of curvature of the road.

9. A driving state monitoring apparatus according to claim 1, wherein said driving state determining means calculates a statistic including at least a mean value from a plurality of measured data of a lateral deviation behavior quantity which indicates lateral deviation of the running locus with respect to the behavior reference, and sets a threshold for determining whether or not the driving state is proper, according to the calculated statistic.

10. A driving state monitoring apparatus according to claim 1, wherein said driving state determining means determines whether or not the driver intends to make a lane change, and when said driving state determining means determines that the driver does not intend to make the lane change and that the driving state is not proper, it is determined that the driving state of the driver is abnormal.

11. A driving state monitoring apparatus according to claim 4, wherein said vehicle behavior feature parameter calculating means calculates the lateral deviation of the running locus with respect to the behavior reference and calculates a maximum amplitude of the lateral deviation in a predetermined time period as the lateral deviation behavior quantity.

12. A driving state monitoring apparatus according to claim 3, wherein said behavior reference setting means obtains a simple regression line according to changes in the behavior parameter and sets the simple regression line as the behavior reference, and said vehicle behavior feature parameter calculating means calculates an area of a region surrounded by the running locus and the simple regression line as the lateral deviation behavior quantity.

* * * * *